No. 744,922. PATENTED NOV. 24, 1903.
C. A. LINDSTRÖM.
CENTER BEARING PLATE.
APPLICATION FILED JUNE 4, 1903.
NO MODEL.
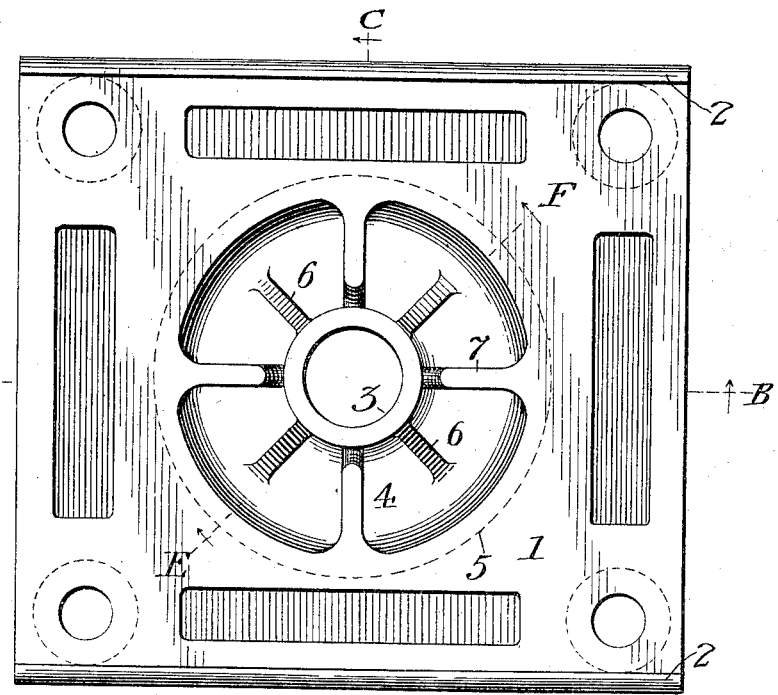
Fig. 1.
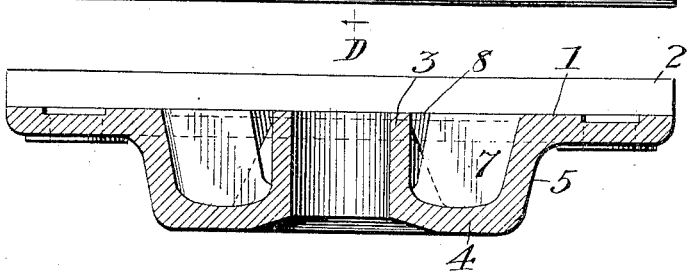
Fig. 2.
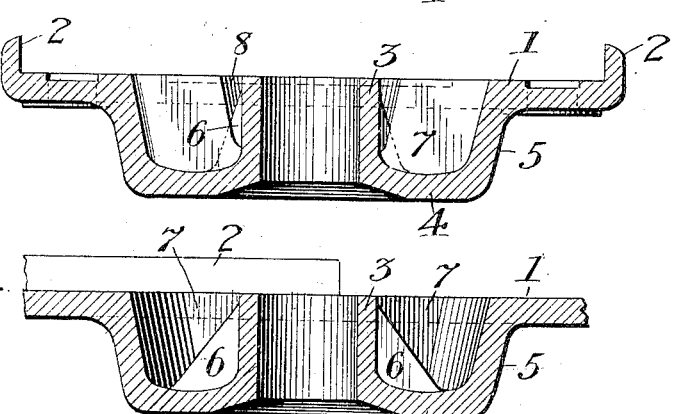
Fig. 3.
Fig. 4.
Witnesses:
D. W. Edelin.
Ada E. Briggs.
Inventor.
Charles A. Lindström
by Wm. H. Finckel
Atty.

No. 744,922. Patented November 24, 1903.

UNITED STATES PATENT OFFICE.

CHARLES A. LINDSTRÖM, OF ALLEGHENY, PENNSYLVANIA, ASSIGNOR TO PRESSED STEEL CAR COMPANY, OF PITTSBURG, PENNSYLVANIA, A CORPORATION OF NEW JERSEY.

CENTER-BEARING PLATE.

SPECIFICATION forming part of Letters Patent No. 744,922, dated November 24, 1903.

Application filed June 4, 1903. Serial No. 160,080. (No model.)

*To all whom it may concern:*

Be it known that I, CHARLES A. LINDSTRÖM, a citizen of the United States, residing at Allegheny, in the county of Allegheny and State of Pennsylvania, have invented a certain new and useful Improvement in Center-Bearing Plates, of which the following is a full, clear, and exact description.

In the manufacture of cast center-bearing plates for cars in which a king-bolt socket is surrounded by a wall arranged at some distance from it the socket and wall have been connected by brackets cast with the other parts, and it has been found that these brackets are apt to break incident to their shrinking in cooling, and thus is impaired their efficiency and that of the bearing-plate as a whole. The strength of the bearing-plate is materially increased by these brackets when whole.

The object of the invention is to retain the brackets, while providing against their breakage in cooling.

The invention consists in a center-bearing plate having brackets projecting alternately from the socket and the outer wall in opposite directions and without complete contact with the part toward which they extend. Thus the brackets projecting from the socket do not extend fully to the outer wall and those that project from the outer wall fall short of the socket, and the result is that no matter how much shrinkage in cooling may take place in these brackets they are not broken.

In the accompanying drawings, illustrating the invention, in the several figures of which like parts are similarly designated, Figure 1 is an inverted plan view of a body center-bearing plate. Fig. 2 is a section taken in the plane of line A B, Fig. 1. Fig. 3 is a section taken in the plane of line C D, Fig. 1. Fig. 4 is a section taken in the plane of line E F, Fig. 1.

The flange 1 may be of usual construction, with edge flanges 2 to engage the sides of the bolster. (Not shown.) The king-bolt socket 3 is made as a cylindrical tube rising from the bottom 4 of the hollow bearing-lug to the plane of the flange 1. The lug has the outer wall 5, which coöperates with a complemental bearing-plate on the truck-bolster. Brackets 6 project from the socket toward the outer wall, but short of it. These brackets are shown as vertically-arranged inclined parts connected on their vertical lines with the socket and on their base-lines with the bottom 4. Brackets 7 project from the outer wall toward but just short of the socket, being separated from the socket by a wedge-like space 8. The brackets 6, projecting from the socket, and the brackets 7, projecting from the outer wall, are arranged in alternation, so as to get the greatest number of brackets in a given space and to correspondingly increase the strength of the casting. Since the brackets do not connect the socket and outer wall by complete contact, it follows that any shrinkage taking place in cooling the casting will have no harmful effect upon them.

The invention is not limited to the form of bearing-plate shown, and various alterations of the shown plate may be made without departing from the spirit and principle of the invention.

What I claim is—

1. A center-bearing plate, having a king-bolt socket, an outer circumscribing wall, and brackets projecting from each without meeting the other.

2. A cast center-bearing plate, having its projecting hollow lug provided with radial brackets unconnected with the wall of the lug opposite the wall from which they project.

3. A center-bearing plate, having a king-bolt socket, a circumscribing wall, and brackets projecting alternately from the socket and wall and of less length than the distance between socket and wall.

4. A cast center-bearing plate, having brackets between its king-bolt socket and outer wall, and connected alternately to the socket and wall.

In testimony whereof I have hereunto set my hand this 3d day of June, A. D. 1903.

CHARLES A. LINDSTRÖM.

Witnesses:
E. E. PORQEUS,
J. C. LANGFITT,